United States Patent [19]

Greenwood et al.

[11] Patent Number: 4,618,203
[45] Date of Patent: Oct. 21, 1986

[54] ISOLATED GROUND DEVICE FOR FLAT UNDERCARPET CABLE

[75] Inventors: William S. Greenwood, Nutley; Karl Weinmann, Watchung, both of N.J.

[73] Assignee: Thomas & Betts Corporation, Raritan, N.J.

[21] Appl. No.: 720,648

[22] Filed: Apr. 8, 1985

[51] Int. Cl.[4] .......................................... H01R 11/20
[52] U.S. Cl. .............................. 339/99 R; 339/14 R
[58] Field of Search ................ 339/14 R, 17 F, 97 R, 339/97 P, 98, 99 R, 119, 156 R, 157 R, 158, 176 MF

[56] References Cited

U.S. PATENT DOCUMENTS

| | | | |
|---|---|---|---|
| 2,964,587 | 12/1960 | Minot | 174/117 |
| 3,143,214 | 8/1964 | Moore et al. | 211/26 |
| 3,189,863 | 6/1965 | Leach | 339/99 |
| 3,281,762 | 10/1966 | Jones | 339/198 |
| 3,355,699 | 11/1967 | Oshva | 339/99 |
| 3,496,518 | 2/1970 | Neumann et al. | 339/21 |
| 3,816,816 | 6/1974 | Meier | 339/99 |
| 3,818,415 | 6/1974 | Evans et al. | 339/17 |
| 3,832,503 | 8/1974 | Crane | 200/51 |
| 3,864,011 | 2/1975 | Huber | 339/103 |
| 3,907,396 | 9/1975 | Huber | 339/103 |
| 4,181,388 | 1/1980 | Donato | 339/21 |
| 4,240,687 | 12/1980 | Bunnell et al. | 339/99 |
| 4,240,688 | 12/1980 | Sotolongo | 339/122 |
| 4,289,370 | 9/1981 | Storck | 339/125 |
| 4,351,579 | 9/1982 | Kordes et al. | 339/14 |
| 4,463,998 | 8/1984 | Reavis et al. | 339/40 |
| 4,479,692 | 10/1984 | Greenwood et al. | 339/99 |
| 4,480,889 | 11/1984 | Greenwood et al. | 339/99 |

FOREIGN PATENT DOCUMENTS 2031215  3/1974  Fed. Rep. of Germany .
2254395  5/1974  Fed. Rep. of Germany .

OTHER PUBLICATIONS

Hubbell System PDC Application Installation Manual, pp. 1-28.
Wiremold ® Fantom Flex TM Undercarpet Wiring System, 1982, pp.1-12.

Primary Examiner—Gil Weidenfeld
Assistant Examiner—Paula A. Austin
Attorney, Agent, or Firm—Robert M. Rodrick; Salvatore J. Abbruzzese

[57] ABSTRACT

An adapter is provided for making electrical connection to a flat, multiconductor isolated ground cable. The cable, containing either four or five conductors, includes a neutral conductor, a ground conductor, an isolated ground conductor and at least one live conductor. The adapter includes three contacts having insulation displacement portions that are disposed in registry with and for connection to the neutral, isolated ground and a live conductor, respectively. The ground conductor of the cable is connected to a metallic base supporting the adapter. The contact for the isolated ground is disconnectably attached to the adapter from its undersurface and the insulation displacement portion for connection to the live conductor is selectively movable. A direct contact pedestal having insulation displacement contacts may be connected to the adapter through a cable link so that an isolated ground circuit with a suitable electrical outlet may be provided.

22 Claims, 7 Drawing Figures

ISOLATED GROUND DEVICE FOR FLAT UNDERCARPET CABLE

FIELD OF THE INVENTION

The present invention relates to a device for use with isolated ground cables and more particularly to an adapter that provides for attachment of a direct contact receptacle to a four or five conductor, flat power cable.

BACKGROUND OF THE INVENTION

Flat conductor cable (FCC) underlying carpet tiles is in present use to supply electrical power to various points of use, as for example, handling lighting and appliance loads in commercial buildings. The flat conductor cable includes in a common form thereof a plurality of flat conductors i.e., live, neutral and ground conductors encased in a plastic electrically insulative casing and additionally having a metallic shield disposed at the upper surface of the cable. A layer typically made of tough insulation material may be provided on the bottom of the cable as an abrasion protection shield. The metallic shield is electrically grounded to provide against electrical hazard, such as accidental piercing of the shield and the live conductor by an object, which object, since the shield is connected to ground, is rendered unhazardous to a person who might contact same. An advantage of the use of this type of conductor cable is the ease with which it can be installed beneath carpeting while at the same time allowing for transfer of power therefrom at selected locations, pedestals or transfer receptacles being installed for such purpose.

Various specialized types of devices including receptacles are known for establishing power take-off from the flat conductor cable at a given location as well as for effecting splicing of a branch line to a main. Thus, for connecting a receptacle at a desired location, a terminal block carrying insulation-piercing members or contacts can be secured over the flat conductor cable with the contacts piercing the flat conductor cable to establish continuity with the respective cable conductors. A receptacle can then be placed over the terminal block with suitable connection between the terminals of the block and contact points in the receptacle being made with round wire discrete conductors. With such installation the cable run can be terminated at the take-off location or it may pass through the terminal block so that additional receptacles can be connected further down the line.

It is also known to use, for purposes of providing power take-off, a direct contact receptacle which embodies insulation-displacement contacts (IDC's) therein and employed when installed directly over a conductor cable to have these piercing contacts electrically connectively engage the conductors in the cable. Such a receptacle is shown in commonly-assigned U.S. Pat. No. 4,479,692 issued on Oct. 30, 1984 and entitled "Receptacle for Flat Multi-Conductor Cable".

The increased use of desktop computers and other microprocessor based products which handle digital input signals has led to specialized power requirements to protect against line "noise" or interference. In general, attempts at meeting these requirements are being made through the use of power line filters or conditioners. Additionally, a power line grounding conductor to the receptacle grounding terminal for that equipment is being run separate from the ground conductor which connects the receptacle mounting frame to the grounding point of the building. Such ground provisions are referred to as "isolated ground" circuits and require that in addition to a neutral and live conductor, there be two other conductors, one each for separate ground paths. One path is exclusively used for sensitive equipment, such as desktop computers.

In buildings wired with round conductors, the installation of an isolated ground receptacle presents little difficulties. The junction boxes and floor pedestals can readily accommodate the extra conductor and provide for its proper connection. However, in buildings wired with flat conductor cable installed under carpets, the installation of an isolated ground receptacle creates more of a problem. Various techniques are known by which a receptacle can be connected to four or five conductor flat conductor cable. Until recently, these techniques involved making a transition from the flat cable to round jumper wire and then making the connections to those round jumper wires. A recent development as described in commonly-assigned U.S. patent application Ser. No. 630,794 filed on July 13, 1984, by the inventors herein and entitled "Device for Flat Multiconductor Cable Connection", discloses a device which provides for a direct contact receptacle to be connected to a selected live conductor in the four or five conductor cable. This device does not provide a means by which the receptacle grounding terminal may be connected to a conductor other than that connected to the building ground. Accordingly, it is desirable to provide a means for installing a direct contact receptacle to an isolated ground circuit without need of additional round jumper wires.

SUMMARY OF THE INVENTION

It is the primary object of the present invention to provide an improved device for connection to an isolated ground circuit.

It is a further object of the present invention to provide an adapter that permits connecting a direct contact receptacle to an isolated ground circuit employing flat multiconductor cable.

In accordance with the invention, an adapter is provided for electrical connection to a flat multiconductor cable having a neutral conductor, a ground conductor, an isolated ground conductor and at least one live conductor. The adapter includes an insulative housing having a first surface and an opposite second surface, said second surface adapted to be placed in juxtaposition with the cable. Three electrical contacts are included in the housing, one contact each for the neutral, isolated ground, and live conductor. Each contact has a terminal portion for connection thereto, the terminal portions being disposed at the housing first surface. The contacts each further include an insulation displacement portion disposed at the second surface of the housing for registry and connection respectively with the neutral conductor, isolated ground conductor and a live conductor. The insulation displacement portion of the contact for the isolated ground conductor is removably connected to the contact.

In a particular form of the invention, the insulation displacement portion for the live conductor is selectively movable relative to the contact terminal portion. The adapter further includes conductive means insulated from the electrical contacts for electrical connection to the cable ground conductor. Such conductive means may include a metallic base whereby the structure mounting the adapter may be maintained at the building ground while the separate isolated ground is carried through the adapter to a receptacle mounted on the adapter.

DETAILED DESCRIPTION OF THE PREFERRED EMBODIMENT

Figure 1:
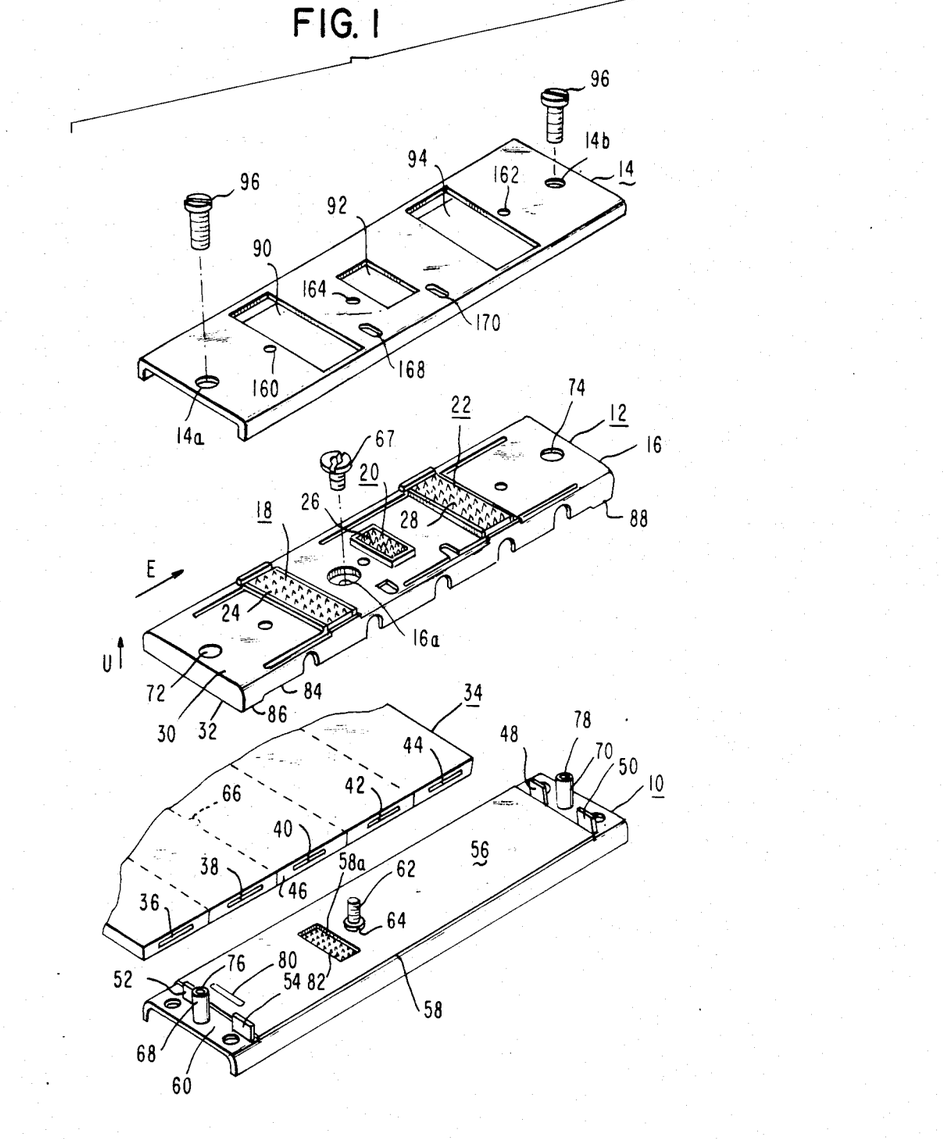
FIG. 1 is an exploded, perspective view of the adapter of the present invention shown also with a five conductor flat cable to which the adapter is to be connected.

Referring now to FIG. 1 of the drawing, an adapter in accordance with the invention is shown, including base 10, contact support assembly 12 and cover 14. Contact support assembly 12 includes a housing 16 formed of a suitable insulative material and is generally of rectangular configuration, being elongate in direction E and upstanding in direction U. The housing supports three electrical contacts 18, 20 and 22, each contact having a terminal portion 24, 26 and 28 that preferably include insulation displacement contact members. Terminal portions 24, 26 and 28 are disposed at the upper surface 30 of the housing 16 in a manner to permit connection to a direct contact pedestal as will be described hereinafter.

Contacts 18, 20 and 22 each include insulation displacement portions, to be discussed more particularly below in connection with FIG. 2, such insulation displacement portions being disposed at the lower surface 32 of housing 16 for engagement with conductors of a cable 34. Cable 34 is shown to be of five conductor, flat cable type and is particularly provided to be used as an isolated ground cable. As illustrated, cable 34 has a neutral conductor 36, a ground conductor 38, an isolated ground conductor 40, and two live conductors 42 and 44 for phase connections. The conductors are encased in a jacket 46 of insulation, the jacket 46 being suitably marked as by color-coding to provide identification of each of the conductors.

Base 10, preferably formed of a suitable metal, includes cable guides 48–54 aside cable receipt expanse 56 which is defined by an insulative layer 58 disposed on the upper surface 60 of base 10. Securing means 62 is preferably integral with base 10 and is in the form of a threaded member having an annular insulator 64 adjacent insulative layer 58. The positioning of threaded means 62 in relation to guides 48–54 is such that, upon placement of cable 34 upon base 10, means 62 passes through cable 34 at location 66, i.e., through the insulation between conductors 38 and 40, at which time annular insulator 64 is resident in cable 34, precluding electrical continuity, through means 62, between conductors 38 and 40. A threaded bushing 67 is provided to threadably engage threaded means 62 through opening 16a to thereby provide an intermediate fastener for securing the contact support assembly 12 to the base 10 in a manner to minimize bowing of the insulative housing 16. It should be noted that with four-conductor cable, for example, such positioning of threaded means 62 through the cable can be assured by using the neutral conductor 36 as a reference and placing the adjacent edge of the cable into engagement with base guides 52 and 54. Upstanding posts or projections 68 and 70 will, upon assembly of contact support assembly 12 with base 10, nest in underside recesses 72 and 74 in housing 16. Guides 48–54 in combination with suitable supports on housing 16 will provide further anti-bowing or anti-deflection capability for base 10 and cable 34 seated thereon. Posts 68 and 70 include threaded central openings 76 and 78, respectively, for assembly purposes. A white indicium 80 is preferably applied to insulative layer 58 to indicate to the user the proper polarization of cable 34 with respect to the base 10, namely, that white (neutral) conductor 36 should overly indicium 80.

An insulation displacement contact member 82 is conductively attached to the base 10, the insulation piercing teeth projecting through an opening 58a in the insulative layer 58 and above the cable receiving expanse 56. Insulation displacement contact member 82 is located to be in registry with the cable ground conductor 38 such that upon sandwiching the cable 34 between the contact support assembly 12 and the base 10, the insulation piercing teeth of contact member 82 will electrically engage the cable ground conductor 38. As will be set forth hereinbelow, the metallic base 10 will then be at the same ground potential as the cable ground conductor 38.

As is shown in FIG. 1, the housing 16 includes a central lower indentation 84 through which cable 34 will extend upon assembly. Legs 86 and 88 of housing 16 will abut the upper surface 60 of base 10 on assembly. Metallic cover 14 is dimensioned to fit telescopically over housing 16 on assembly and includes upper surface openings 90, 92 and 94, through which contact terminal portions 24, 26 and 28 respectively extend. In assembly, openings 14a and 72 are aligned, as are openings 14b and 74 to permit threading of screws 96 into posts 68 and 70.

Figure 2:
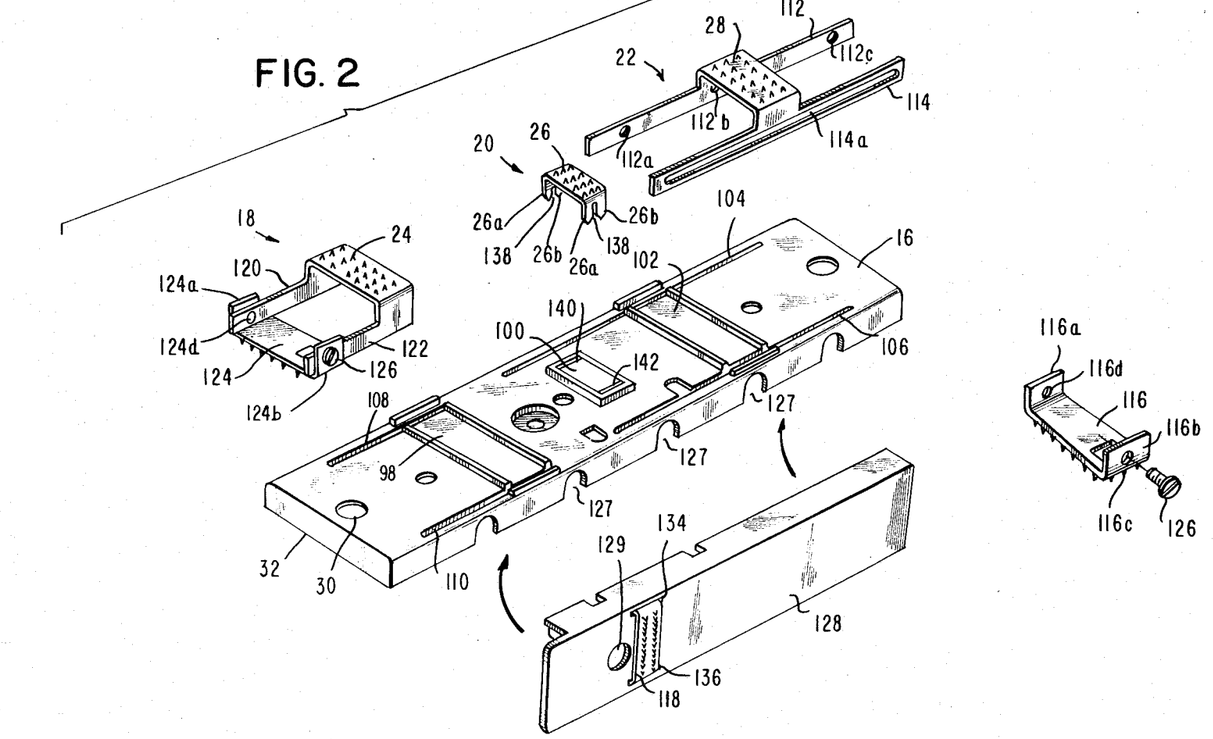
FIG. 2 is a perspective, exploded view of the contact support assembly of FIG. 1 and the contacts supported thereby.

Referring to FIG. 2, wherein the electrical contacts are shown in exploded manner relative to housing 16, it is seen that upper surface 30 includes contact seats 98, 100 and 102, the perimeters of which extend upwardly from surface 30 in measure equal to the depth of cover 14 adjacent openings 90–94 of FIG. 1. Elongate channels 104 and 106 extend in both directions from contact seat 102. Channels 108 and 110 extend leftwardly of contact seat 98.

Contact 22 has substantially parallel rails 112 and 114 integral therewith that serve as conductive means for electrically connecting terminal portion 28 with its counterpart insulation displacement portion 116 at the undersurface of housing 16 as referred to above. As will be discussed further below, contact portion 116 is supported in rails 112 and 114 for translatory sliding movement in housing 16. Contact 20 includes terminal portion 26 that is electrically interconnected with its counterpart insulation displacement portion 118. Contact 18 has integral flanges 120 and 122 serving as conductive means for connecting the terminal portion 24 with its counterpart insulation displacement portion 124, shown in connection therewith.

Contact 22 includes in rail 114 a track 114a to support contact portion 116 for translation into any selective one of three positions. For defining such positions, flange 112 includes detents in the form of through openings 112a, 112b and 112c. The selectivity may be limited to the two most rightward positions, if desired, by providing a suitable mechanical stop in the rails or in the housing 16. Contact 116 includes end flanges 116a and 116b, which are respectively exteriorly aside flanges 112 and 114 upon assembly of the contact 22. A threaded member 126 passes through an opening 116c, through track 114a and is threaded into a wall (not shown) struck upwardly from the floor of contact portion 116 to secure the contact assembly. Boss 116d is situated on the interior side of flange 116a and is sized to removably reside in any of openings 112a, 112b or 112c to effect the proper positioning of contact portion 116.

An assembly of contact 18 is shown in FIG. 2 with parts being identified in a manner similar to those designated for contact 22, contact portion 124 being fixed and not movable relative to terminal portion 24.

Housing 16 and contacts 18 and 22 are assembled as follows. Rails 112 and 114 are inserted downwardly through channels 104 and 106, until contact terminal portion 28 resides on seat 102. Flanges 120 and 122 are similarly disposed through channels 108 and 110, until contact terminal portion 24 resides on seat 98. Next, contact portion 124 is placed into the underside of housing 16 and secured to flanges 120 and 122. Selection is made for the location of contact portion 116 and it is inserted into the underside of member 10, translated into selected position and secured in place to rails 112 and 114. Cut-outs 127 may be provided in the housing sides to facilitate assembly of contacts 18 and 22 by access to screws 126. The particular construction, operation and assembly of contacts 18 and 22 in housing 16 is similar to that shown in commonly-owned U.S. patent application Ser. No. 630,794 referred to hereinabove.

In accordance with a preferred arrangement of the present invention, the insulation displacement portion 118 of contact 20, which contact 20 is to be electrically interconnected to the isolated ground conductor 40 of cable 34, is removable from the housing 16. As depicted in FIG. 2, contact portion 118 is supported on an elongate insulative support member 128 that is disconnectable from the undersurface 32 of the housing 16. Support member 128 has an aperture 130 for passage therethrough of the threaded means 62. As seen with further reference to FIG. 3, the support member 128 includes a pair of side walls 128a and 128b at the longitudinal edges of the support member 128 and depending upwardly from a floor 128c. Extending inwardly from each of the walls 128a and 128b are a plurality of longitudinally spaced projections 128d. Supported interiorly of the support member are a pair of conductive elements 130, one element 130 being shown in place against the projections 128d and the other element 130 being shown in exploded view. Each element includes a plurality of pairs of projecting tabs 130a, each pair of tabs 130a being disposed adjacent to each side of a projection 128d.

Figure 3:
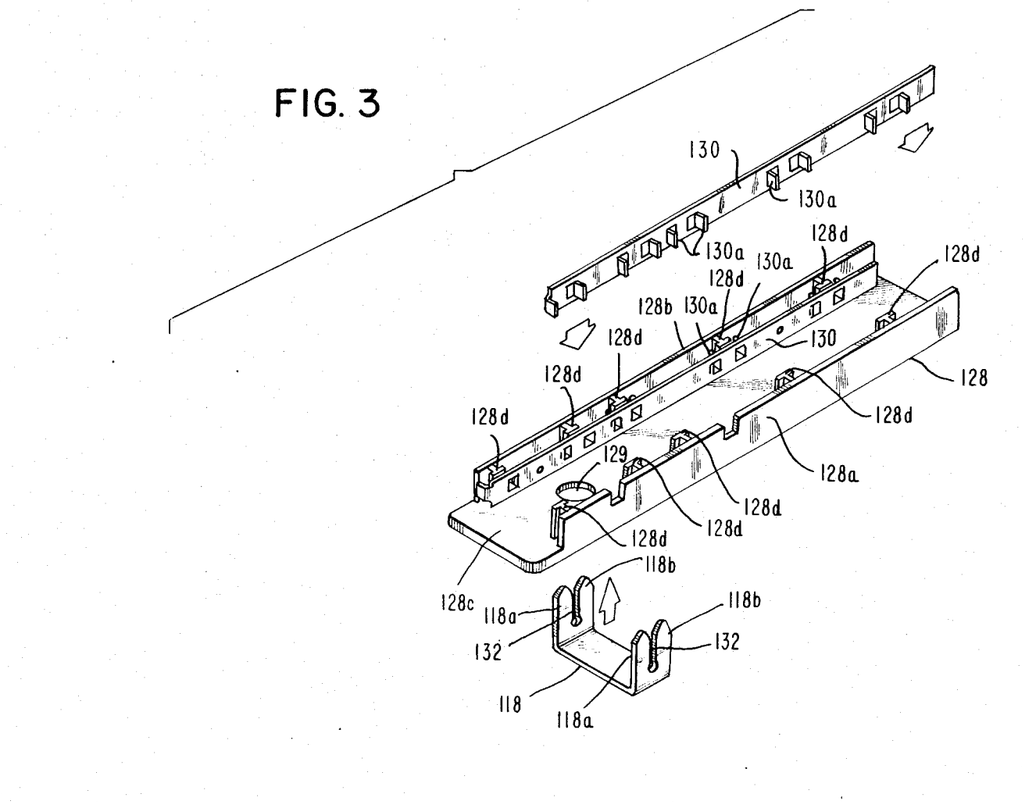
FIG. 3 is a perspective, partially exploded view of the isolated ground contact support structure.

Insulation displacement portion 118 includes a pair of tines 118a and 118b on each side of the portion 118. Each pair of tines 118a and 118b defines a slot 132 therebetween. The tines 118a and 118b are insertable into a pair of openings 134 and 136 (FIG. 2) formed through the floor 128c of the support member 128. Upon insertion of the tines into the openings 134 and 136, the projections 128d enter the slots 132 such that the interior edges of tines 118a and 118b frictionally engage the projections 128d. The exterior edges of the tines 118a and 118b frictionally engage the tabs 130a on the conductive elements 130. As such the portion 118 is placed in removable conductive engagement with the conductive elements 130.

Terminal portion 26 of contact 20 as depicted in FIG. 2 is formed similarly to portion 118 in that it includes a pair of tines 26a and 26b defining slots 138. Terminal portion 26 is insertable through openings 140 and 142 formed through seat 100 in housing 16. Upon insertion, terminal portion 26, through its tines 26a and 26b, frictionally engages the tabs 130a of the conductive elements 130 and is thereby in conductive connection therewith. In assembly of the isolated ground contact 20 to the housing 16, the support member with conductive elements 130 is secured to the underside of the housing by way of frictional engagement of the sidewalls 128a and 128b. The terminal portion 26 is inserted through openings 140 and 142 making connection with the conductive elements 130 until situated on the seat 100. The contact portion 118 is then inserted through openings 134 and 136 in the support member, making connection with the conductive elements 130 until situated on the lower surface of the support member 128.

In the preferred arrangement shown in FIG. 2, the insulation displacement portion 118 is placed in disposition for registry with and connection to the isolated ground conductor 40 of cable 34 upon assembly of the cable and adapter. It should be appreciated, however, that it may be desirable to provide a connection to an isolated ground conductor that is designated to be in a position other than that of conductor 40. In this regard, the conductive elements 130 in the support member 128 are formed to be of sufficient length to span a dimension at least as large as the distance covering two adjacent cable conductors. As such, openings 134 and 136 in the support member may be placed at a different location along the length of the support member 128 so that the portion 118 may engage the conductive elements 130 and make contact with another cable conductor such as, for example, conductor 42. For this purpose, knockouts may be provided along the length of support member 128 so as to enable the forming and use of such additional openings. Removability of the support member 128 from housing 16 further facilitates such use.

Figure 4:
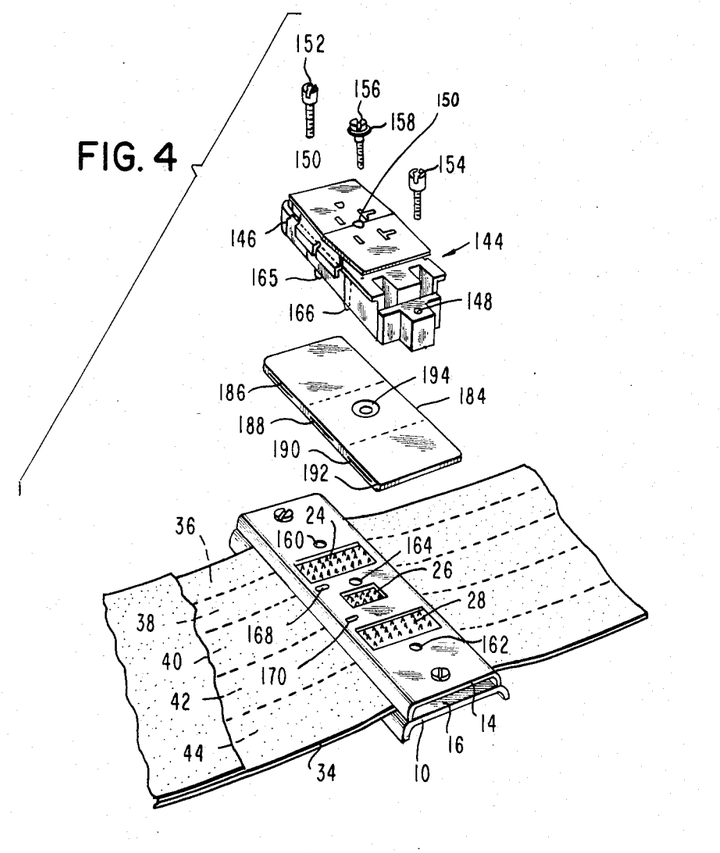
FIG. 4 is a perspective, exploded view of a direct contact power receptacle to be connected through a cable link to the multiconductor flat cable attached to the adapter of FIG. 1.

Turning now to FIG. 4, the assembly of a direct contact receptacle 144 to the adapter is described. Receptacle 144, being preferably of the type shown and described in U.S. Pat. No. 4,479,692, as referred to hereinabove, carries indicia as at 146 which is cooperative with the indicia on the cable 34 indicative of proper receptacle orientation to ensure correct polarity of electrical connections to be made. The receptacle has through passages 148 and 150 for receipt respectively of fastener screws 152, 154 and a grounding screw 156. An insulative washer 158 is placed beneath the head of grounding screw 156, the purpose of which will be described. The cover includes threaded openings 160, 162 and 164 for threaded receipt of the screws 152, 154 and 156 upon joining of the receptacle 144 to the adapter. The receptacle 144 also includes tabs 165 and 166 which are to be received in openings 168 and 170 of the cover 14 for further proper receptacle orientation.

Figure 5:
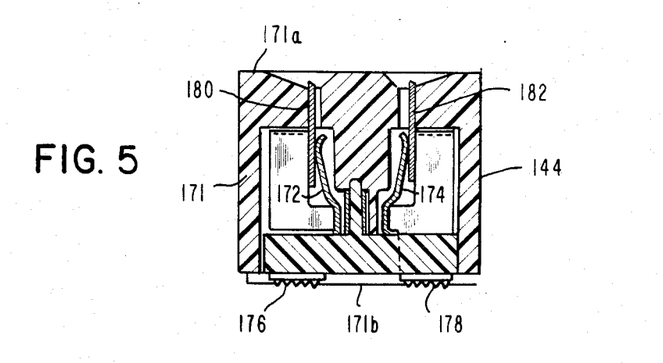
FIG. 5 is a typical sectional view of the FIG. 4 receptacle with appliance plug prongs shown in place.

The receptacle 144 comprises an insulative body 171 supporting three electrical contacts, each having, as depicted in FIG. 5, a terminal, for example, as shown at 172 and 174 for external connection adjacent the body upper surface 171a and an engagement portion as shown at 176, 177 (not shown) and 178, the engagement portions each having insulation displacement contact members adjacent the body lower surface 171b. Appliance prongs 180 and 182 are shown, for example, in electrical engagement with terminals 172 and 174.

Connection of the direct contact recepacle 144 to the adapter is effected through a cable link 184 as seen in FIG. 4. Cable link 184 contains three conductors 186, 188 and 190 surrounded by an insulative layer 192. The link 184 has an opening 194 for passage therethrough of the grounding screw 156, a portion of the conductor 188 around the opening being removed such that the diameter of the opening in the conductor 188 is greater than the diameter of the opening 194 in the insulative layer 192.

Upon assembly of the receptacle 144, link 184 and adapter, the insulation displacement contact members of adapter terminals 24, 26 and 28 penetrate through the undersurface of link 184 and engage conductors 186, 188 and 190, respectively. Similarly, the insulation displacement contact members of receptacle engagement portions 176, 177 and 178 penetrate through the uppersurface of link 184 and engage conductors 186, 188 and 190, respectively. As shown in FIG. 4, cable 34 has a ground shield 35 extending thereover. A portion of the ground shield 35 may be formed to run continuously through the adapter in assembly with the cable 34 over ground conductor 38.

Figure 6:
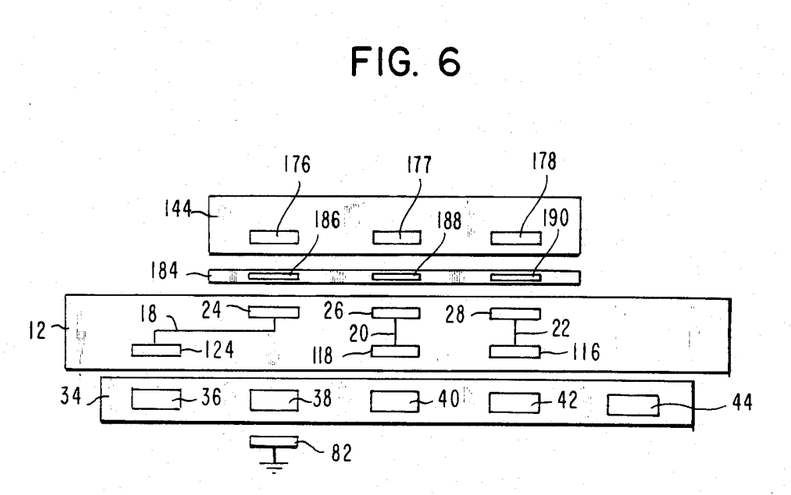
FIGS. 6 and 7 are schematic views showing respective different phase connections made to the cable of FIG. 1 through the use of the adapter of the present invention.

Referring to FIG. 6, the adapter and receptacle are schematically shown in a first operative state in attachment to an isolated ground cable 34. Neutral cable conductor 36 is connected through adapter contact 18 and through link conductor 186 to receptacle contact 176. Isolated ground conductor 40 is connected through adapter contact 20 and through link conductor 188 to receptacle ground contact 177. Cable live conductor 42 is connected through adapter contact 22 and through link conductor 190 to receptacle contact 178. The cable ground conductor 38 is connected through the contact member 82 to the metallic base 10 and to the building ground. It can now be seen that the receptacle mounting structure, inclusive of the base member 10 and metal cover 14 are maintained at the building ground while a separate isolated ground is carried to the receptacle ground contact 177. To ensure that the building ground and isolated ground circuits remain separate, the insulative washer 158 is provided beneath the head of the grounding screw 156. As the grounding screw 156 is threadably secured into the cover 14, washer 158 allows the screw 156 to be insulated from the receptacle ground contact 177 upon fastening of the receptacle to the adapter.

Figure 7:
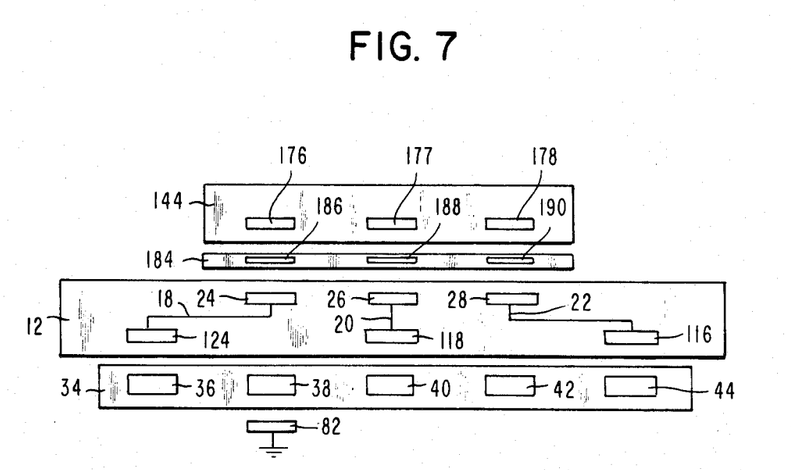

The versatility of the invention is further exemplified with respect to FIG. 7. In FIG. 7, all connections are the same as in FIG. 6 with the exception that cable live conductor 44 is connected through adapter contact 22 and through link conductor 190 to receptacle contact 178. This is effected through the selectability of the movable insulation displacement portion 116. It can be appreciated that the connections illustrated in FIGS. 6 and 7 can be accomplished with a five conductor cable having at least two live conductors 42 and 44. The connections shown in FIG. 6 may also be accomplished with a four conductor cable having at least one live conductor 42.

While the preferred embodiment of the invention has been described herein, it should be appreciated that various changes may be made without departing from the contemplated scope of the invention. Thus, the particularly described embodiment is intended in an illustrative and not limiting sense. The true scope of the invention is set forth in the following claims.

We claim:

1. An adapter for electrical connection to a flat multiconductor cable having a neutral conductor, a ground conductor, an isolated ground conductor and at least one live conductor, comprising:
    an insulative housing having a first surface and an opposite second surface, said second surface adapted to be placed in juxtaposition with said cable;
    three electrical contacts in said housing, one contact for said neutral conductor, one contact for said isolated ground conductor and one contact for one live conductor, each contact having a terminal portion for connection thereto, said terminal portions being disposed at said first surface of said housing, said contacts each having an insulation displacement portion disposed at the second surface of said housing for registry and connection respectively with said neutral conductor, said isolated ground conductor and one live conductor, said insulation displacement portion of said contact for said isolated ground conductor being removably connected to said contact.

2. An adapter according to claim 1, wherein said contact terminal portions each include insulation displacement contact members.

3. An adapter according to claim 1, wherein said insulation displacement portion of said contact for said isolated ground conductor is supported by an insulative support member removably attached to said housing.

4. An adapter according to claim 3, wherein said support member includes therein a conductive element electrically connected to said terminal portion of said contact which is to be connected to said isolated ground conductor, said support member having at least one opening therein, said insulation displacement portion of said contact for said isolated ground conductor extending into said opening and in disconnectable engagement with said conductive element.

5. An adapter according to claim 4, wherein said conductive element in said support member has a length sufficient to span at least the dimension of two adjacent cable conductors which are to be connected at said housing.

6. An adapter according to claim 4, wherein said insulation displacement portion to be connected to the cable isolated ground conductor is frictionally supported in said support member.

7. An adapter according to claim 1, wherein at least one contact has its insulation displacement portion selectively movable relative to the contact terminal portion.

8. An adapter according to claim 7, wherein said contact having said selectively movable insulation displacement portion comprises a pair of spaced, substantially parallel rails, said rails being supported by said housing, said movable insulation displacement portion being slidable on said rails.

9. An adapter according to claim 1, including a base for supporting said housing, said housing and said base adapted to receive and sandwich said cable therebetween.

10. An adapter according to claim 9, wherein said housing and said base include means for joining said housing and said base together, said joining means including at least one fastening member disposed to pierce through said cable in the joining of said base, housing and cable.

11. An adapter according to claim 9, wherein said base is metallic and includes an insulation piercing contact conductively attached thereto, said insulation piercing contact being disposed on said base at a location for registry and connection with said cable ground conductor, whereby said metallic base and said cable ground conductor will be at the same ground potential upon joining of said base, housing and cable.

12. An adapter according to claim 11, including a metallic cover for overlying said housing, said cover having openings for access to said contact terminal portions at said housing first surface, said cover being conductively attached to said metallic base.

13. An adapter for electrical connection to a flat multiconductor cable having a neutral conductor, a ground conductor, an isolated ground conductor and at least one live conductor, comprising:
an insulative housing having a first surface and an opposite second surface, said second surface adapted to be placed in juxtaposition with said cable;
three electrical contacts in said housing, each contact having a terminal portion for connection thereto, said terminal portions of said contacts being disposed at said first surface of said housing, said contacts each having an insulation displacement portion disposed at the second surface of said housing, one insulation displacement portion being disposed for registry and connection with said cable neutral conductor, a second insulation displacement portion being disposed for registry and connection with said cable isolated ground conductor and a third insulation displacement portion being selectively movable for registry and connection with one live conductor; and
conductive means insulated from said electrical contacts for electrical connection to said cable ground conductor.

14. An adapter according to claim 13, wherein said conductive means includes a metallic base for supporting said housing, said base including an insulation piercing contact conductively attached thereto, said insulation piercing contact being disposed for registry and connection with said cable ground conductor, said base and said housing adapted to receive and sandwich said cable therebetween.

15. An adapter according to claim 13, wherein said insulation displacement portion of said contact to be connected to the cable isolated ground conductor being removably supported on said housing.

16. An adapter according to claim 15, wherein said insulation displacement portion of said contact to be connected to the cable isolated ground conductor is supported on an insulative support member removably supported by said housing.

17. An adapter according to claim 16, wherein said support member includes therein a conductive element electrically connected to said terminal portion of said contact which is to be connected to said isolated ground conductor, said support member having at least one opening therein, said insulation displacement portion to be connected to the cable isolated ground conductor extending into said opening and in disconnectable engagement with said conductive element.

18. An adapter according to claim 16, wherein said conductive element in said support member has a length sufficient to span at least the dimension of two adjacent cable conductors which are to be connected at said housing.

19. An adapter according to claim 16, wherein said housing includes an opening through said first surface, said terminal portion of said contact to which said isolated ground is to be connected extending into said opening and in disconnectable engagement with said conductive element.

20. A kit of parts for installing an isolated ground circuit employing flat multiconductor cable having at least four conductors spaced within insulation, said conductors including a neutral conductor, a ground conductor, an isolated ground conductor and at least one live conductor, comprising:
an adapter having a first surface and an opposite second surface, said second surface being adapted for juxtaposition with said cable, said adapter including three insulatively spaced electrical contacts each having at the first surface a terminal portion and at the second surface an insulation displacement portion, said insulation displacement portions being disposed for registry and electrical connection with said neutral conductor, said isolated ground conductor and a live conductor, respectively, said insulation portion disposed for connection to said isolated ground conductor being removably connected to said housing; and
a receptacle including an insulative body having an upper surface and a lower surface, said lower surface adapted to be placed adjacent said first surface of said adapter, said body including three electrical contacts each having a terminal adjacent said upper surface for external connection thereto and an engagement portion adjacent said lower surface, said engagement portions adapted to be respectively electrically connected to said terminal portions of said contacts of said adapter.

21. A kit of parts as claimed in claim 20, wherein said insulation displacement portion to be connected to said live conductor is movable relative to said adapter.

22. A kit of parts as claimed in claim 20, wherein said terminal portions in said adapter each comprise insulation displacement contact members and wherein said engagement portions of said contacts in said receptacle each comprise insulation displacement contact members, said kit further including a cable link having three conductors encased in an outer jacket of insulation, said cable link adapted to be engaged by the insulation displacement contact members of the contacts in said adapter and by the insulation displacement contact members of the contacts in said receptacle to thereby electrically connect the respective contacts of said adapter and said receptacle.

* * * * *